June 20, 1972    A. S. MACKIN    3,671,096

ERASABLE HOLOGRAPHIC RECORDING

Filed Feb. 3, 1971    2 Sheets-Sheet 1

INVENTOR.
ARTHUR S. MACKIN
BY
ATTORNEY

3,671,096
ERASABLE HOLOGRAPHIC RECORDING

Arthur S. Mackin, Philadelphia, Pa., assignor to the United States of America as represented by the Secretary of the Navy
Filed Feb. 3, 1971, Ser. No. 112,167
Int. Cl. G02b 27/22
U.S. Cl. 350—3.5                                                13 Claims

ABSTRACT OF THE DISCLOSURE

A holographic system records optical information on alkali halide crystals. The crystals are irradiated with an electron beam producing defects in the crystalline structure. The primary defect is in the F band although a small number of M bands are formed at the same time. The wavelength of a laser beam used for recording falls within the F absorption band. This converts the F centers to R and M centers. Reconstruction of the hologram can be made with light whose wavelength falls within either the F, R or M absorption band, the F band being destructive and the R and M bands nondestructive. The recorded information can be erased by exposing the crystal to an electron beam.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates to an improved system for recording and reproducing holograms. More particularly, the system provides an improved means for recording holographic information on alkali halide crystals that have been irradiated with an electron beam. In addition, the system provides means for either destructive or nondestructive reconstruction of a recorded image as well as a method of erasing the recorded information.

At the present time, holographic recording is done almost exclusively on high resolution photographic film. The primary disadvantage of using photographic film is the necessity of developing the film after exposure. This requires the film be removed from the holographic set-up for development. This imposes limitations in that the time involved in handling and processing the film makes it impossible to use it in real time applications and mechanical equipment for precise film realignment is required. This is particularly true in optical correlation applications. Another limitation of the film for certain applications is the permanency of the recording. Since the information cannot be erased, a new piece of film is required for each new recording. This can be expensive both from the standpoint of material cost and film transport and storage equipment. An article by the present inventor, gives additional background on previous holographic recording systems and methods. Mackin, A. S., Holographic Recording on Electron Beam Colored Sodium Chloride Crystals, Applied Optics, 9(7) pp. 1658–1664, July 1970.

SUMMARY OF THE INVENTION

Accordingly, it is the general purpose of the present invention to provide an improved holographic system capable of a high degree of resolution and usable in real time applications. It is a further object of the present invention to provide means for erasing the recorded information.

In the present system, these features are obtained by irradiating an alkali halide crystal with a beam of electrons striking the surface of the crystal to form F and M centers. The irradiated surface is placed in a recording plane of a holographic setup and a laser beam used for recording is chosen to be within the F absorption band of the crystal. Reconstruction is possible with light whose wavelength falls within the F, R or M absorption bands. An erasure of the recorded information can be accomplished by exposing the crystal to an electron beam.

DESCRIPTION OF THE PREFERRED EMBODIMENT

Figure 1:
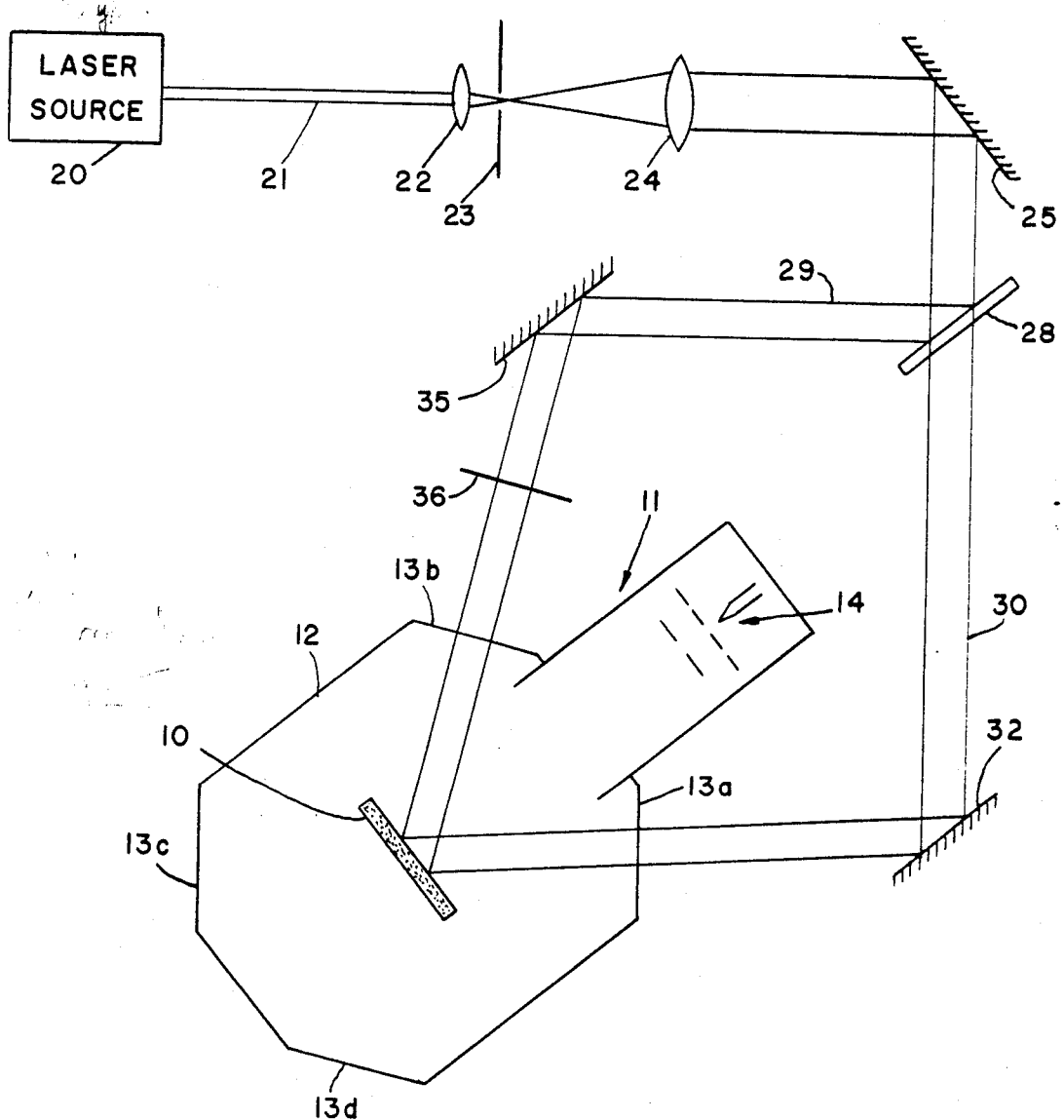
FIG. 1 illustrates an embodiment of an arrangement for recording holograms according to the invention.

Referring now to FIG. 1, a polished alkali halide crystal 10 is inserted in an evacuated electron gun 11 with a cylindrical metallic sidewall 12, four optically flat windows 13a, 13b, 13c and 13d and electron beam generator 14.

A laser source 20 such as a krypton iron laser with a variable wavelength emits a beam 21 that falls within the F absorption band. A lens 22 directs the laser beam through a pin hole filter 23 onto a lens 24 that further directs the beam through to a mirror 25. A beam splitter 28 receives the reflected beam from mirror 25 and divides the beam into an object beam 29 and a reference beam 30. The reference beam 30 is reflected off of a mirror 32 through the optically flat window 13a of electron gun 11 on to the alkali halide crystal 10. The object beam 29 is reflected from mirror 35 on to object 36 which in the present case is transparent, although the principles of the invention apply to opaque objects as well. The object 36 signal modulates the beam 29 and supplies it to alkali halide crystal 10 through window 13b.

The operation of the entire system will now be described with reference to the figures. The source of electrons for irradiating the crystal 10 can be any standard electron gun.

Figure 2:
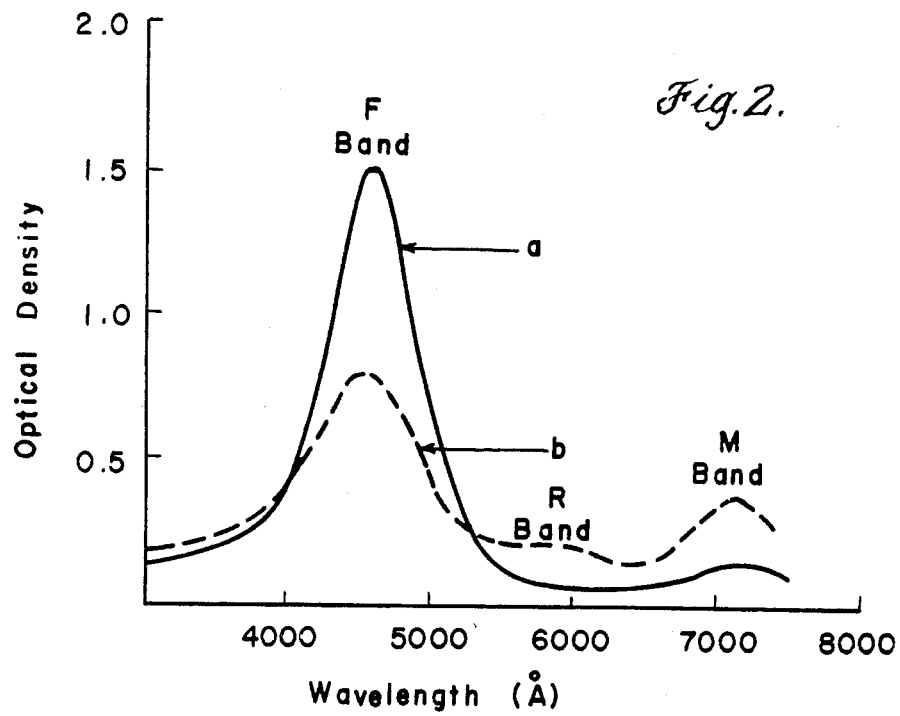
FIG. 2 show the absorption spectrum for a colored and an illuminated NaCl crystal shown in FIG. 1.

In the present embodiment the source 14 of electron gun 11 emits electrons on to the alkali halide crystal 10 which may be a sodium chloride crystal. In FIG. 2, curve a, the absorption spectrum of a sodium chloride crystal was irradiated by 50 kv. electrons for seven seconds at a rate of 1.3 $\mu$a./cm.$^2$. The penetration depth of color center defects formed in sodium chloride at the 50 kv. accelerating voltage was 15 microns. The absorption bands which are shown in FIG. 2 are designated F, R and M and this refers to the defect which causes the absorption. The primary defect is the F center. In addition a small number of M centers are also formed at the same time.

A laser beam of 4762 angstrom radiation is then supplied from source 20. This is within the F band of the sodium chloride crystal 10. The reference beam 30 and object beam 29 strike the crystal 10 surface.

At every point where the light is absorbed by the NaCl crystal 10, its F centers are converted to R and M centers. This is shown in curve b of FIG. 2. The holographic interference pattern is recorded in the form of varying concentration of F, R and M centers. Where the laser light has interfered constructively, the absorption in the F band will decrease while in the R and M bands it will increase.

Reconstruction of the hologram may be provided by merely removing beam splitter 28 and having a beam from laser source 20 pass through lens 22, pin hole filter 23 and lens 24, on to mirrors 25 and 32, through optically flat window 13a on to the crystal 10. Alternative methods of reconstruction would be to place an optical shutter (not shown) in the path of the object beam or to place the laser source facing any of the optically flat windows 13a, 13b, 13c or 13d and emitting a beam onto the crystal 10 surface.

The source can apply a beam for reconstruction whose wavelength falls within the F, R or M absorption bands. For light in the F band, the reconstruction process will be destructive, since this light will continue to bleach the F centers in the crystal. However, reconstruction in the R and M bands will be nondestructive, since these centers are not bleached by light at room temperature. When the hologram is reconstructed with light whose wavelength differs from that used for the construction process, it is necessary that the reconstructing beam have a different angle of incidence. The relationship which must be satisfied for thick holograms is given by the following equation:

$$\lambda_1/\lambda_2 = \sin \alpha_1 / \sin \alpha_2 \qquad (1)$$

where $\lambda_1$ is the wavelength used for constructing the hologram, $\lambda_2$ is the wavelength used for reconstructing the image, $\alpha_1$ is the angle the reference and signal beam make with the crystal normal during construction, and $\alpha_2$ is the angle the reconstructing beam makes with the crystal normal.

Figure 3:
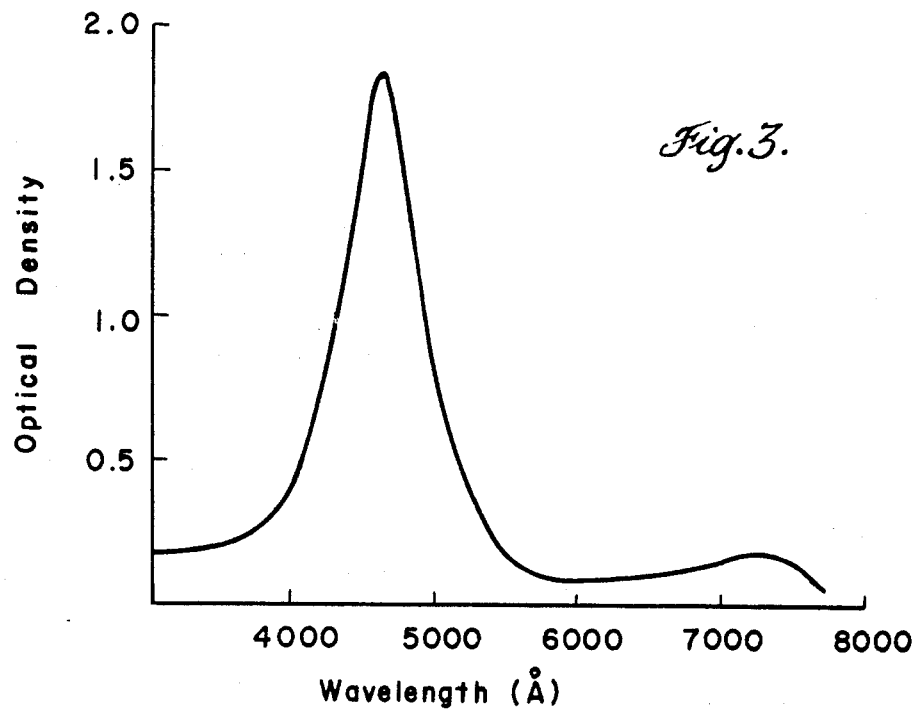
FIG. 3 shows the absorption spectrum of a re-exposed NaCl crystal associated with FIG. 1.

The recorded hologram can be erased by exposing the crystal to an electron beam. The electron beam reconverts the R and M centers formed during bleaching back to F centers. In FIG. 3 the absorption spectrum of a sodium chloride crystal of FIG. 2b is shown after re-exposing the crystal for 5 seconds to a 50 kv. electron beam with a 0.52 $\mu$a./cm.$^2$ current density. A specific illustration but not limiting example of crystals and energy sources of the recording system useful for holographic reproduction will now be given.

EXAMPLE 1

A sodium chloride crystal 1.27 centimeters in diameter approximately 2 millimeters thick is polished on both sides to one wavelength flatness. An electron beam of 50 kv. and a current density of 1.3 $\mu$a./cm.$^2$ striking the crystal surface for 7 seconds was sufficient to color a crystal to an optical density of 1.3 at the maximum of the F absorption band (4650 angstroms). The penetration depth of the color centers was 15 microns. Recording was done in the F band using the 4762 angstrom radiation of a krypton iron laser. Reconstruction was made at 4762 angstroms resulting in a gradual destruction of the recorded hologram through the bleaching action on the F centers at this wavelength.

EXAMPLE 2

A sodium chloride crystal had a hologram constructed as in Example 1. Nondestructive reconstruction with a krypton iron laser was made at 5682 angstroms by shifting the angle between the reconstructing beam and the crystal normal to satisfy above Equation 1.

EXAMPLE 3

A potassium chloride crystal 1.27 centimeters in diameter and approximately 2 millimeters thick whose F band contains the 5682 angstrom line is polished and exposed to an electron beam according to Example 1. Recording was done in the F band using the 5682 angstrom radiation of a krypton iron laser. Reconstruction was made at 5682 angstroms resulting in a gradual destruction of the recorded hologram through the bleaching action of the F centers at this wavelength.

It has therefore been shown a system suitable for providing holographic recorded information using alkali halide crystals that can be erased and reused and does not require additional processing after exposure.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. A holographic recording system comprising:
   a sodium chloride crystal having a thickness of two millimeters;
   electron beam generating means enclosing said sodium chloride crystal including an evacuated tube with at least two optically flat windows for radiating an electron beam of 50 kv. and a current density of 1.3 $\mu$a./cm.$^2$ onto said crystal to form F centers within said crystal;
   laser generating means for generating a coherent light beam of a wavelength within the F band of said crystal;
   beam splitting means for receiving said coherent light beam and splitting said coherent light beam into an object beam and a reference beam;
   object means for receiving said object beam and signal modulating said object beam through one of said optically flat windows onto said crystal; and
   reflecting means for reflecting said reference beam through another of said optically flat windows onto said crystal.

2. A holographic recording system comprising:
   an alkali halide crystal;
   electron beam generating means enclosing said alkali halide crystal and having an evacuated tube with at least two optically flat windows for radiating a beam of electrons on to said alkali halide crystal for coloring said alkali halide crystal to form F centers;
   laser generating means for generating a coherent light beam of a wavelength within the F band of said alkali halide crystal;
   beam splitting means for receiving said coherent light beam and splitting said coherent light beam into an object beam and a reference beam;
   object means for receiving said object beam and signal modulating said object beam and conducting said modulated object beam through one of said optically flat windows on to said alkali halide crystal; and
   reflecting means for reflecting said reference beam through another of said optically flat windows on to said alkali halide crystal.

3. A holographic recording system according to claim 2 further comprising:
   a pair of optical lenses interposed between said laser generating means and said beam splitting means.

4. A holographic recording system according to claim 3 further comprising:
   a pin hole filter interposed between said laser generating means and said beam splitting means.

5. A holographic recording system according to claim 4 wherein said beam generating means further comprises said evacuated tube having two pairs of optically flat windows diametrically opposed to each other.

6. A holographic recording system according to claim 5 wherein said alkali halide crystal is sodium chloride.

7. A holographic recording system according to claim 6 wherein said laser generating means further comprises:
   a krypton iron laser for generating coherent electromagnetic radiation between 4762 angstroms and 5682 angstroms.

8. A holographic recording system according to claim 5 wherein said alkali halide crystal is potassium chloride.

9. A holographic recording process comprising the steps of:
   coloring a polished alkali halide crystal with an electron beam to form F centers;
   generating coherent reference and object beams of a wavelength within the F band of said alkali halide crystal;

modulating said object beam by exposing an object to said object beam; and exposing said alkali halide crystal to said reference beam and said modulated object beam for recording holographic information.

10. The method according to claim 9 including the additional steps of:

generating a reconstructing beam of a wavelength within the F band of said alkali halide crystal;

exposing said crystal to said reconstructing beam; and exposing said crystal to an electron beam to erase the recorded holographic information.

11. The method according to claim 9 including the additional steps of:

generating a reconstructing beam within the R band of said alkali halide crystal;

exposing said crystal to said reconstructing beam; and exposing said crystal to an electron beam to erase the recorded holographic information.

12. The method according to claim 9 including the additional steps of:

generating a reconstructing beam within the M band of said alkali halide crystal;

exposing said crystal to said reconstructing beam; and exposing said crystal to an electron beam to erase the recorded holographic information.

13. The method as recited in claim 9 in which the alkali halide crystal is selected from the group consisting of sodium chloride and potassium chloride.

References Cited

UNITED STATES PATENTS 3,296,594    1/1967    Van Heerden _____ 350—3.5

JOHN K. CORBIN, Primary Examiner

R. L. SHERMAN, Assistant Examiner

U.S. Cl. X.R.

96—27 H